(12) United States Patent
Birka (10) Patent No.: US 8,985,650 B2
(45) Date of Patent: Mar. 24, 2015

(54) BUMPER MADE USING A RESISTIVE IMPLANT WELDING PROCESS

(75) Inventor: Mark P. Birka, Northville, MI (US)

(73) Assignee: Magna International Inc. (CA)

( * ) Notice: Subject to any disclaimer, the term of this patent is extended or adjusted under 35 U.S.C. 154(b) by 0 days.

(21) Appl. No.: 13/983,919

(22) PCT Filed: Feb. 10, 2012

(86) PCT No.: PCT/US2012/024650
§ 371 (c)(1),
(2), (4) Date: Aug. 6, 2013

(87) PCT Pub. No.: WO2012/109541
PCT Pub. Date: Aug. 16, 2012

(65) Prior Publication Data
US 2013/0307281 A1      Nov. 21, 2013

Related U.S. Application Data

(60) Provisional application No. 61/462,961, filed on Feb. 10, 2011.

(51) Int. Cl.
| | | |
|---|---|---|
| *B60R 19/03* | (2006.01) | |
| *B29C 65/34* | (2006.01) | |
| *B29C 65/00* | (2006.01) | |
| *B29L 31/30* | (2006.01) | |
| *B29C 65/48* | (2006.01) | |
| *B29C 65/58* | (2006.01) | |

(52) U.S. Cl.
CPC ............... *B60R 19/03* (2013.01); *B29C 65/344* (2013.01); *B29C 66/112* (2013.01); *B29C 66/131* (2013.01); *B29C 66/1312* (2013.01); *B29C 66/30341* (2013.01); *B29C 66/721* (2013.01); *B29C 65/3476* (2013.01); *B29C 65/34* (2013.01); *B29C 66/543* (2013.01); *B29L 2031/3044* (2013.01); *B29C 65/48* (2013.01); *B29C 65/58* (2013.01); *B29C 66/124* (2013.01); *B29C 66/71* (2013.01); *B29C 66/7212* (2013.01); *B29C 66/72143* (2013.01)
USPC ........................................................ 293/120

(58) Field of Classification Search
USPC ........... 296/187.01, 193.01, 193.06, 203.019, 296/187.12; 293/120, 154
IPC ........................................................ B60R 19/03
See application file for complete search history.

(56) References Cited

U.S. PATENT DOCUMENTS

| | | | |
|---|---|---|---|
| 4,113,295 A  * | 9/1978 | Wenrick ........................ | 293/121 |
| 7,560,003 B2 * | 7/2009 | Naughton et al. .............. | 156/91 |
| 2008/0152919 A1 | 6/2008 | Grgac et al. | |

FOREIGN PATENT DOCUMENTS

GB            1 205 221        9/1970

*Primary Examiner* — Pinel Romain
(74) *Attorney, Agent, or Firm* — Warn Partners, P.C.

(57) ABSTRACT

A bumper (10) created using a resistive implant welding process. The bumper includes a mounting plate portion (12) and a composite bumper portion (14). The mounting plate portion (12) is connected to the composite bumper portion (14) using a resistive implant welding process. In one embodiment, the present invention includes a bumper for a vehicle having a mounting plate (12) and a bumper portion (14). The bumper portion (14) includes at least one flange (24) formed as part of the bumper portion (14), a first contact area (28) formed as part of the mounting plate (12), and a second contact area (30) formed as part of the flange (24). A connection point is used to bond the first contact area (28) and the second contact area (30) such that the mounting plate (12) is connected to the bumper portion (14).

14 Claims, 6 Drawing Sheets

BUMPER MADE USING A RESISTIVE IMPLANT WELDING PROCESS

CROSS-REFERENCE TO RELATED APPLICATION

This application is the U.S. National Phase Application of PCT/US2012/024650, filed Feb. 10, 2012, which claims the benefit of U.S. Provisional Application No. 61/462,961, filed Feb. 10, 2011.

FIELD OF THE INVENTION

The present invention relates to a composite bumper made using a resistive implant welding process.

BACKGROUND OF THE INVENTION

Rust accumulation on the bumper of a truck or sport utility vehicle is a common problem, especially in climates where the bumper is exposed to severe weather conditions. Typically, bumpers, and more particularly the rear bumper of a vehicle, may be damaged from stones or other debris which is thrown up from the tires of the vehicle or other vehicles while traveling; this is also referred to as "stone blast." Vehicles having a diesel engine also have problems with rusted bumpers because of exhaust emissions from the diesel engine. Most exhaust pipes are near the rear of the vehicle, therefore, the exhaust fumes from the diesel engine are emitted near the bumper. The exhaust emissions from a diesel engine come in contact with the surface of the bumper, and can cause corrosion, leading to rust on the surface of the bumper.

The damage from the stone blast or the corrosion is worsened in areas where weather conditions are more severe due to the bumper being exposed to greater amounts of moisture, accelerating the rust process.

Accordingly, there exists a need for an improved bumper which withstands stone blast and exposure to exhaust emissions.

SUMMARY OF THE INVENTION

The present invention is directed to a bumper created using a resistive implant welding process. The bumper includes a mounting plate portion and a composite bumper portion. The mounting plate portion is connected to the composite bumper portion using a resistive implant welding process.

In one embodiment, the present invention includes a bumper for a vehicle having a mounting plate and a bumper portion. The bumper portion includes at least one flange formed as part of the bumper portion, a first contact area formed as part of the mounting plate, and a second contact area formed as part of the flange. A connection point is used to bond the first contact area and the second contact area such that the mounting plate is connected to the bumper portion.

A mesh is disposed between the first contact area and the second contact area such that when the mesh is heated, the first contact area and the second contact area melt and material from the first contact area and material from the second contact area flows through the mesh. When the mesh cools, the first contact area is molded to the second contact area, forming the connection point.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Throughout this section and the drawings, like reference numbers are used to show similar structures.

Referring to the Figures generally, a composite bumper arrangement made according to the present invention is shown generally at 10. The bumper 10 includes a mounting plate portion or mounting plate 12 and a bumper portion 14. Also included are two decorative covers 16 which are connected to the bumper portion 14.

Optionally included is a trailer hitch 18, which is also connected to the mounting plate 12. There is a hitch connecting flange 20 formed as part of the mounting plate 12 which are in alignment with a trailer hitch mounting flange 22 formed as part of the trailer hitch 18 when the trailer hitch 18 and mounting plate 12 are assembled, and a set of fasteners (not shown) are inserted though the hitch connection flange 20 and hitch mounting flange 22 to connect the trailer hitch 18 to the mounting plate 12.

Figure 4:
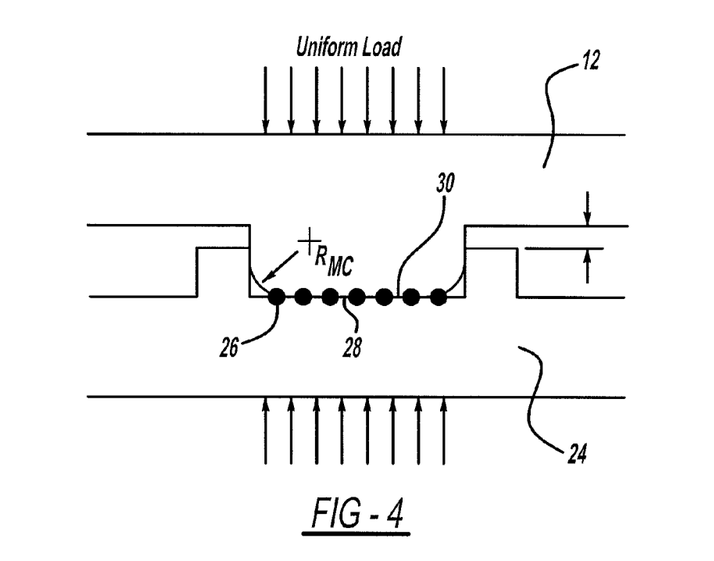
FIG. 4 is a sectional view taken along line 4-4 of FIG. 1.

Formed as part of the bumper portion 14 is a plurality of flanges 24. More particularly, there is a plurality of upturn flanges and downturn flanges formed on the inside of the bumper portion 14, where the upturn flanges and downturn flanges are substantially parallel to each other. One of the flanges 24 is shown in FIG. 4.

To assemble the bumper portion 14 to the mounting plate 12, a mesh 26 is placed in between a first contact area 28 of the mounting plate 12 and a second contact area 30 of the flange 24. The mesh 26 is a steel wire mesh 26, but it is within the scope of the invention that materials other than steel may be used to create the mesh 26. A current is applied to the mesh 26, increasing the temperature of the mesh 26, thereby increasing the temperatures of the contact areas 28, 30, causing the contact areas 28, 30 to melt. As the mesh 26 is heated, pressure is applied to the bumper portion 14 and mounting plate 12. The pressure applied to the bumper portion 14 and mounting plate 12 combined with the melting of the contact areas 28, 30 causes material of the first contact area 28 and material of the second contact area 30 to flow through the mesh 26, and mold together. Once the current is no longer applied to the mesh 26, the material of the flange 24 and the material of the mounting plate 12 cools, and the bumper portion 14 and mounting plate 12 are molded together in the area of the contact areas 28, 30 to provide a connection point, this provides a strong bond between the mounting plate 12 and bumper portion 14.

The mounting plate 12 and bumper portion 14 are made of a long glass fiber material, with the glass fibers being about twelve millimeters in length, but it is within the scope of the invention that glass fibers of other lengths may be used as well. The long glass fiber material used for making the mounting plate 12 and bumper portion 14 is a propylene material, but it is within the scope of the invention that other materials, such as nylon, may be used.

In addition to the flanges 24 being formed as part of the bumper portion 14 as previously described, other types of flanges in different embodiments are used to provide the connection between the mounting plate 12 and the bumper portion 14. For example, flanges may be formed as part of the mounting plate 12 and received into the bumper portion 14, and the bumper portion 14 may be compressed to form a connection using the ultrasonic welding process described above. Other flanges in different configurations may be used as well, depending upon how the bumper portion 14 and mounting plate 12 are to be connected.

Figure 1:
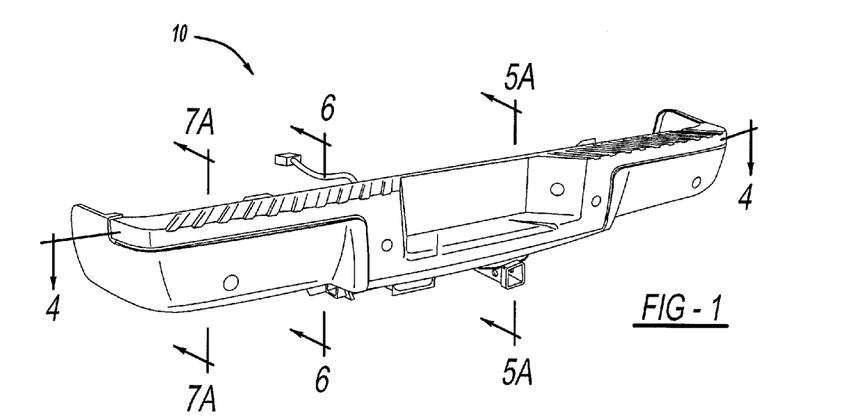
FIG. 1 is a perspective view of a bumper assembled using a resistive implant welding process, according to the present invention.
Figure 2:
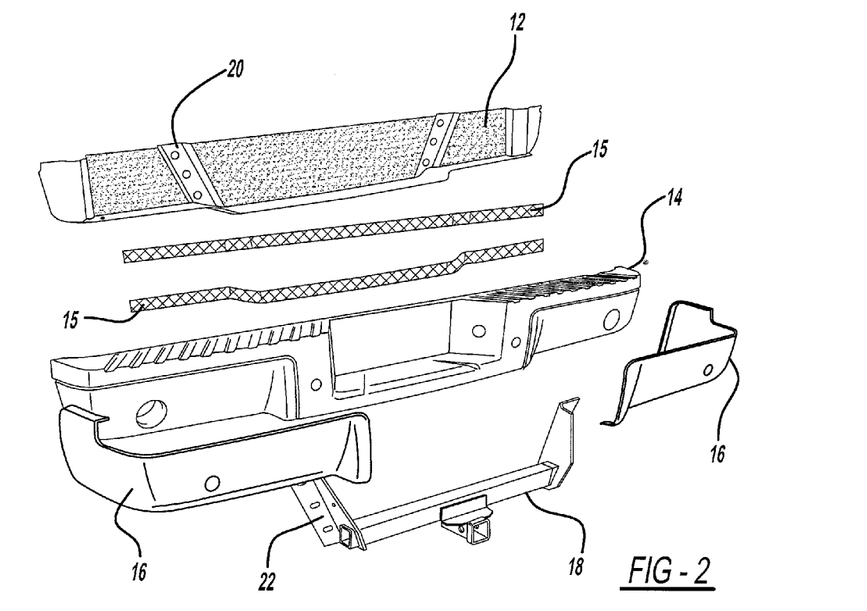
FIG. 2 is an exploded view of a bumper assembled using a resistive implant welding process, according to the present invention.
Figure 3:
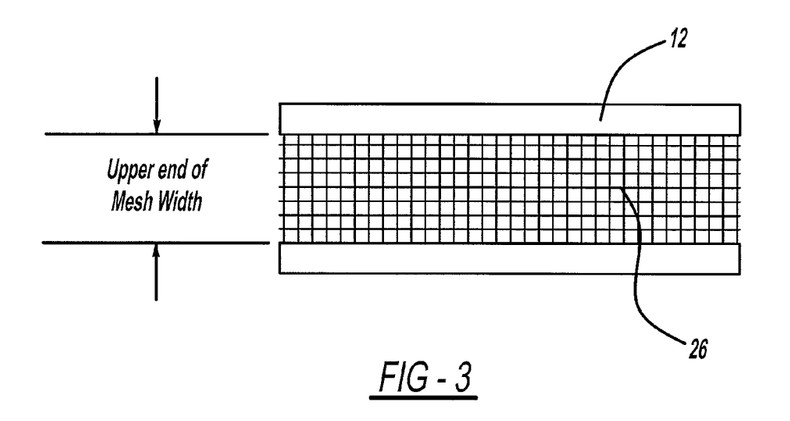
FIG. 3 is a top view of a mesh positioned along part of a mounting plate used as part of a bumper assembled using a resistive implant welding process, according to the present invention.
Figures 5A, 5B:
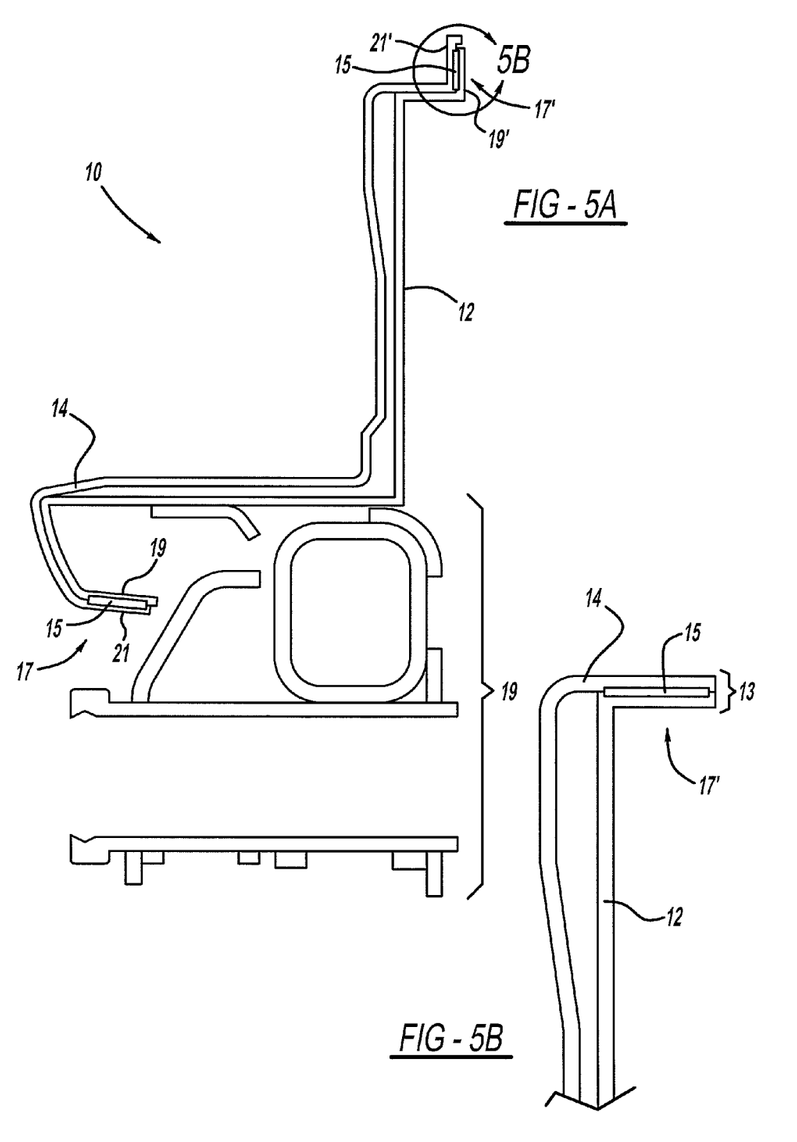
FIG. 5A is a sectional view taken along line 5A-5A of FIG. 1.
FIG. 5B is an exploded sectional view of an alternate connection point in accordance with the present invention.

Referring now to FIGS. 5A, 5B, 6, 7A and 7B, various cross-sectional views of the composite bumper arrangement 10 are shown with the sections being taken along the section lines shown in FIG. 1. The sectional views shown in FIGS. 5A, 5B, 6, 7A and 7B illustrate how the composite bumper arrangement is bonded together at various connection points using resistive implant welding. These drawings also show how the structure of the composite bumper creates strengthening features that make the composite bumper exhibit displacement values at specific forces that are less than the displacement values for a conventional steel bumper. FIG. 5A shows a cross-sectional view of the composite bumper arrangement 10 taken along section 5A-5A of FIG. 1. At this particular location, there are two connection points 17, 17' where the bumper portion 14 is connected to the mounting plate 12. Each connection point 17, 17' has a first contact area 19, 19' of the mounting plate 12 and a second contact area 21, 21' of the bumper portion where the connection point 17, 17' is created. A mesh material 15 is positioned between the first contact area 19, 19' and the second contact area 21, 21' for the purpose of bonding the two contact areas together by resistive implant welding. Resistive implant welding can be used; however it is within the scope of this invention for other types of connections to be used such as adhesives or fasteners. Resistive implant welding involves energizing the mesh material 15 in order to generate heat between the first contact area 19, 19' and the second contact area 21, 21' in order to cause the respective surfaces of the mounting plate 12 and bumper portion 14 in the area of the connection point 17, 17' to melt and bond together. FIG. 5A also shows the location of the trailer hitch 18 relative to the mounting plate 12 and bumper portion 14.

FIG. 5B shows an alternate connection point 17 configuration where the bumper portion 14 and the mounting plate 12 have a turned flange 13 for creating connection point 17' that is horizontal instead of a connection 17' shown in FIG. 5A that is vertical. The horizontal connection point 17' is an alternate embodiment and may not be practical for every application. The alternate embodiment shown in FIG. 5B allows for the bumper portion 14 to rest on top of the mounting plate 12 in order to provide additional strength at the connection point 17'.

Figure 6:
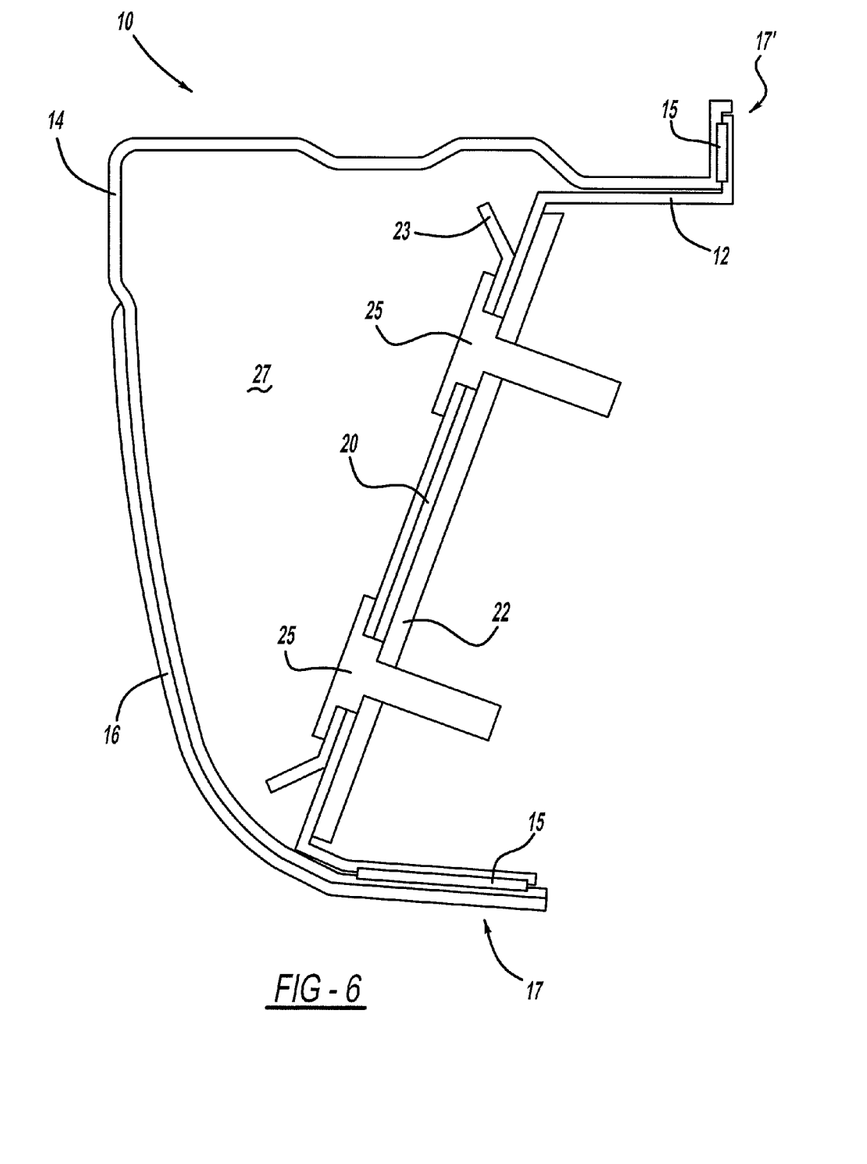
FIG. 6 is a sectional view taken along line 6-6 of FIG. 1.

FIG. 6 shows a second sectional view taken along section lines 6-6 of FIG. 1. The connection points 17, 17' are created in the same manner as described with regard to FIG. 5A. FIG. 6 shows additional structures connected to a composite bumper arrangement 10. In particular, FIG. 6 shows where one of the decorative covers 16 is connected to the bumper portion 14. The decorative cover 16 can be connected to the bumper portion 15 either using adhesives, or in the alternative it is possible to use resistive implant welding and mesh (not shown) placed between the decorative cover 16 and bumper portion 14. Alternatively, it is possible to connect the decorative cover 16 to the bumper portion 14 using a clip or mechanical fastener.

FIG. 6 shows the location of the mounting flange 22 portion of the trailer hitch 18. The mounting flange portion 22 has apertures for receiving fasteners 25 that pass through apertures on the hitch connection flange 20 of the mounting plate 12. Also included at the connection between the hitch mounting flange 22 and hitch connecting flange 20 is a doubler plate 23 that serves to facilitate the connection of the fasteners 25 through the apertures of the hitch connecting flange 20 and trailer hitch mounting flange 22. When the bumper portion 14 is connected to the mounting plate 12, a structural cavity 27 is created. The structural cavity 27 is defined by an area between the mounting plate 12 and bumper portion 14 once the connection points 17, 17' are formed. The structural cavity 27 created by the formed composite bumper arrangement strengthens the composite bumper arrangement to the point that the composite bumper arrangement, as a whole, can resist greater forces than a conventional steel bumper.

Figures 7A, 7B:
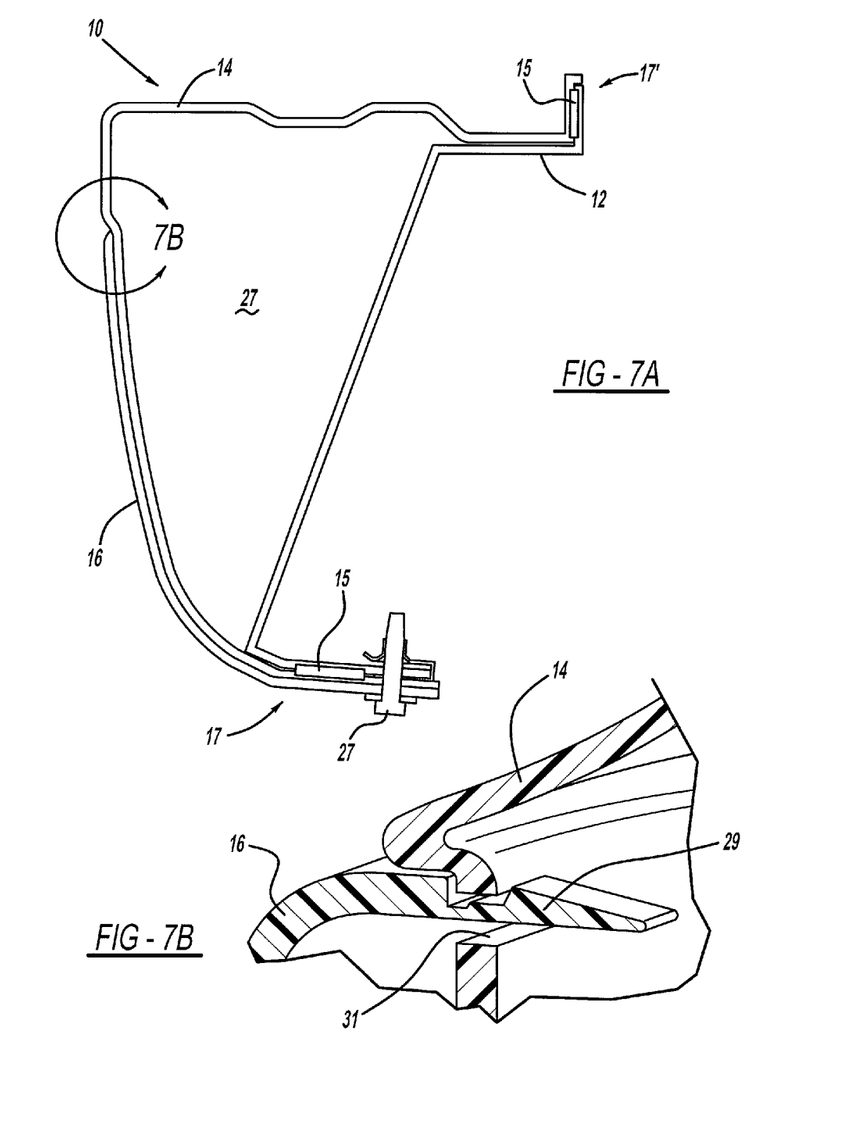
FIG. 7A is a sectional view taken along line 7A-7A FIG. 1.
FIG. 7B is an exploded cross-sectional perspective view of a connection clip in accordance with the present invention.

FIG. 7A depicts a cross-section view taken along section line 7A-7A of FIG. 1. FIG. 7A shows a fastener 27 used as one alternate way of connecting the decorative cover 16 to the bumper portion 14. The fastener 27 extends through one of the decorative covers, bumper portion 14 and support plate 12 where the fastener is secured. FIG. 7B is an exploded perspective view of a portion of FIG. 7A wherein a resilient tab 29 is formed on one end of one of the decorative cover portions 16. The resilient tab 29 is disposed through an opening 31 formed in the bumper portion 14. Thus, the resilient tab 29 allows one of the covers 16 to be snap fit onto the bumper portion 14. The use of the resilient tab 29 is an alternate means of connecting the cover portion 16 that can be used in place of the fastener 27 discussed above. Addition of the cover portion 16 can be resistive implant welded onto the bumper portion 14 or it is possible for adhesives to be used.

Figure 8:
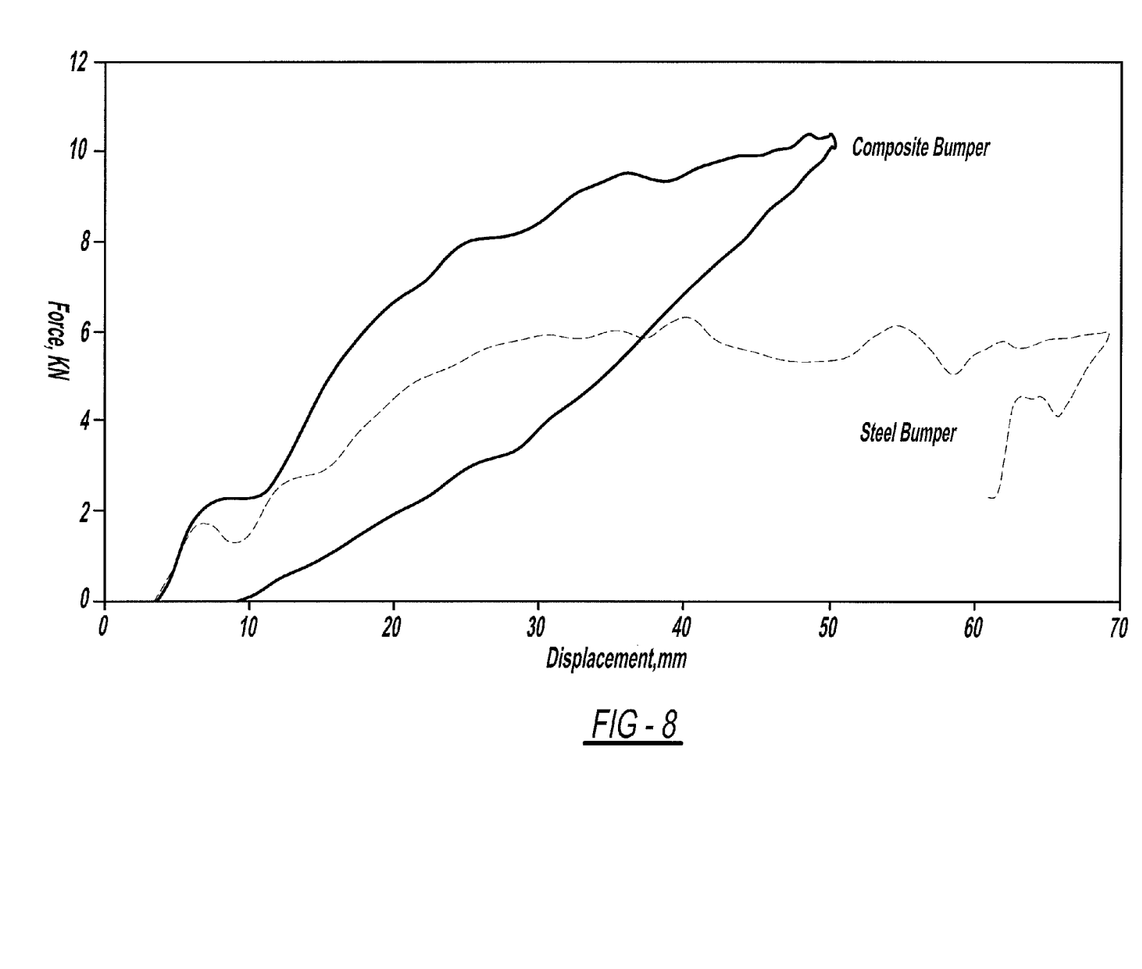
FIG. 8 is a graph showing force versus displacement of a composite bumper in accordance with the present invention compared to a steel bumper.

FIG. 8 shows a graph of force versus displacement tests that were conducted on both a composite bumper and a conventional steel bumper. The composite bumper arrangement when exposed to forces generally between 0 KN to 10.5 KN exhibit a displacement of generally less than 55 mm. Preferably, the composite bumper arrangement 10 in accordance with the present invention when exposed between forces in the range of between 6.5 KN to 10.5 KN will exhibit a displacement in the range between 3 mm to 52 mm. Ideally, the composite bumper arrangement in accordance with the present invention when exposed to forces in a range between 8.5 KN to 10.5 KN will exhibit a displacement between 40 mm to 55 mm. In contrast, a conventional steel bumper when exposed to forces of approximately 10.5 KN to 6.3 KN exhibits a much greater range of displacement than the composite bumper. Displacement is undesirable because it means the steel bumper is being deformed. Additionally, when a conventional steel bumper is exposed to forces approximately greater than 6.2 KN, the bumper shows a displacement value that is much greater than the composite bumper with the displacement range between approximately 38 mm to 68 mm. The graph in FIG. 8 clearly demonstrates that the composite bumper arrangement in accordance with the present invention can withstand greater forces than a conventional steel bumper as measured by the degree of displacement of the bumper when exposed to a force. Generally speaking, the steel bumper cannot withstand forces above 6.5 KN, while the composite bumper clearly has the ability to withstand forces above 6.5 KN. The ability of the composite bumper arrangement to withstand forces above 6.5 KN is a result of the structure of the composite bumper arrangement 10 when the mounting plate 12 is connected to the bumper portion 14 using resistive implant welding in order to create the structural cavity 27. The structural cavity 27 in combination with the bumper portion 14 and mounting plate 12 creates a closed structure that gives the composite bumper arrangements 10 its strength.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A composite bumper arrangement for a vehicle comprising:
   a mounting plate;
   a bumper portion;
   a first contact area formed as part of said mounting plate;
   a second contact area formed as part of said bumper portion;
   a connection point bonding said first contact area and said second contact area such that said mounting plate is connected to said bumper portion;
   wherein the composite bumper arrangement as a whole exhibits displacement of less than 55 mm when exposed to forces between 0 KN to 10.5 KN.

2. The composite bumper arrangement for a vehicle of claim 1, further comprising a mesh disposed between said first contact area and said second contact area such that when said mesh is heated, said first contact area and said second contact area melt such that material from said first contact area and material from said second contact area flows through said mesh, and when said mesh cools, said first contact area is molded to said second contact area, forming said connection point.

3. The composite bumper arrangement for a vehicle of claim 1, wherein said mounting plate and said bumper portion are made from one selected from the group consisting of propylene and nylon.

4. The composite bumper arrangement of claim 1 further comprising one or more decorative covers connected to said bumper portion wherein said each of said decorative cover members further comprise a resilient tab formed on one end of said decorative cover for being disposed through an opening formed on the bumper portion in order to provide a snap fit connection between each of said one or more decorative cover members and said bumper portion.

5. The composite bumper arrangement of claim 1 further comprising a trailer hitch connected to said mounting plate, a hitch connection flange formed on said trailer hitch and a hitch mounting flange formed on said mounting plate, wherein said hitch connection flange and said hitch mounting flange are aligned during assembly and are used to connect said trailer hitch to said mounting plate.

6. A composite bumper arrangement for a vehicle comprising:
   a mounting plate;
   a bumper portion;
   a first contact area formed as part of said mounting plate;
   a second contact area formed as part of said bumper portion;
   a connection point bonding said first contact area and said second contact area such that said mounting plate is connected to said bumper portion; and
   wherein the composite bumper arrangement as a whole exhibits displacement between 3 mm to 52 mm when exposed to forces in a range between 6.5 KN to 10.5 KN.

7. A composite bumper arrangement for a vehicle comprising:
   a mounting plate;
   a bumper portion;
   a first contact area formed as part of said mounting plate;
   a second contact area formed as part of said bumper portion;
   a connection point bonding said first contact area and said second contact area such that said mounting plate is connected to said bumper portion; and
   wherein the composite bumper arrangement as a whole exhibits displacement between 40 mm to 55 mm when exposed to forces in a range between 8.5 KN to 10.5 KN.

8. A composite bumper arrangement for a vehicle comprising:
   a mounting plate;
   a bumper portion;
   a first contact area formed as part of said mounting plate;
   a second contact area formed as part of said bumper portion;
   a connection point bonding said first contact area and said second contact area such that said mounting plate is connected to said bumper portion;
   at least one structural cavity defined by an area between said mounting plate and said bumper portion when said at least one connection point is formed; and
   a trailer hitch connected to said mounting plate, a hitch connection flange formed on said trailer hitch and a hitch mounting flange formed on said mounting plate, wherein said hitch connection flange and said hitch mounting flange are aligned during assembly and are used to connect the trailer to said mounting plate.

9. The composite bumper arrangement of claim 8 further comprising one or more decorative covers connected to said bumper portion wherein said each of said decorative cover members further comprise a resilient tab formed on one end of said decorative cover for being disposed through an opening formed on the bumper portion in order to provide a snap fit connection between each of said one or more decorative cover members and said bumper portion.

10. A composite bumper arrangement for a vehicle comprising:
    a mounting plate;
    a bumper portion;
    a first contact area formed as part of said mounting plate;
    a second contact area formed as part of said bumper portion;
    a connection point bonding said first contact area and said second contact area such that said mounting plate is connected to said bumper portion;

at least one structural cavity defined by an area between said mounting plate and said bumper portion when said at least one connection point is formed; and wherein the composite bumper arrangement as a whole exhibits displacement of less than 55 mm when exposed to forces between 0 KN to 10.5 KN.

11. The composite bumper arrangement of claim 10 further comprising a mesh disposed between said first contact area and said second contact area such that when said mesh is heated, said first contact area and said second contact area melt such that material from said first contact area and material from said second contact area flows through said mesh, and when said mesh cools, said first contact area is molded to said second contact area, forming said connection point.

12. The composite bumper arrangement for a vehicle of claim 10, wherein said mounting plate and said bumper portion are made from one selected from the group consisting of propylene and nylon.

13. A composite bumper arrangement for a vehicle comprising:
- a mounting plate;
- a bumper portion;
- a first contact area formed as part of said mounting plate;
- a second contact area formed as part of said bumper portion;
- a connection point bonding said first contact area and said second contact area such that said mounting plate is connected to said bumper portion;
- at least one structural cavity defined by an area between said mounting plate and said bumper portion when said at least one connection point is formed; and
- wherein the composite bumper arrangement as a whole exhibits displacement between 3 mm to 52 mm when exposed to forces in a range between 6.5 KN to 10.5 KN.

14. A composite bumper arrangement for a vehicle comprising:
- a mounting plate;
- a bumper portion;
- a first contact area formed as part of said mounting plate;
- a second contact area formed as part of said bumper portion;
- a connection point bonding said first contact area and said second contact area such that said mounting plate is connected to said bumper portion;
- at least one structural cavity defined by an area between said mounting plate and said bumper portion when said at least one connection point is formed; and
- wherein the composite bumper arrangement as a whole exhibits displacement between 40 mm to 55 mm when exposed to forces in a range between 8.5 KN to 10.5 KN.

* * * * *